UNITED STATES PATENT OFFICE 2,545,786

5-METHOXYQUINOXALINE-1,4-DI-N-OXIDE

Justus Kenneth Landquist, Blackley, Manchester, England, assignor to Imperial Chemical Industries Limited, a corporation of Great Britain No Drawing. Application May 19, 1950, Serial No. 163,102. In Great Britain July 20, 1949

2 Claims. (Cl. 260—251)

This invention relates to a new quinoxaline derivative which possesses a high degree of chemotherapeutic activity.

I have found that 5-methoxyquinoxaline-1,4-di-N-oxide possesses therapeutic activity especially against infections with virus diseases such as infections with psittacosis and *Lymphogranuloma venereum*. Thus I have found that it is very effective in obviating the ill effects of psittacosis and of *L. venereum* infections in experimental animals.

My invention therefore comprises this new compound.

The said new compound may be made by oxidation by means of per-acids of the corresponding quinoxaline or its mono-N-oxide, for example by oxidation of the corresponding quinoxaline by means of hydrogen peroxide in glacial acetic acid solution. The starting material, the quinoxaline itself, may be obtained in known manner by interaction of the appropriately substituted o-phenylene diamine with glyoxal or with a functional derivative thereof, for example the oxime.

The invention is illustrated but not limited by the following example in which the parts are by weight.

*Example*

20 parts of 5-methoxyquinoxaline (M. P. 75° C.) and 450 parts of a solution of peracetic acid in acetic acid (containing about 1.2 gram molecules of peracetic acid in a litre) are heated at 50–55° C. for 18 hours. The solution is evaporated under reduced pressure (20–30 mm.) to about a quarter of its volume and is treated with 400 parts of ice and sufficient 40% aqueous sodium hydroxide solution to render the mixture faintly alkaline to Brilliant Yellow. The solution is then extracted with chloroform and the chloroform extract is dried and the chloroform is distilled off. 5-methoxyquinoxaline-1,4-di-N-oxide remains as a residue and when crystallised from alcohol has M. P. 222° C.

What I claim is:

1. 5-methoxyquinoxaline-1,4-di-N-oxide.
2. Process for the manufacture of 5-methoxyquinoxaline - 1,4 - di - N - oxide which comprises oxidising 5-methoxyquinoxaline by means of a per-acid.

JUSTUS KENNETH LANDQUIST.

No references cited.